J. H. POPE.
MACHINE FOR CUTTING AND ASSEMBLING SECTIONAL HEEL LIFTS.
APPLICATION FILED OCT. 21, 1918.

1,436,722.

Patented Nov. 28, 1922.
3 SHEETS—SHEET 1.

INVENTOR
Joseph H. Pope.

Patented Nov. 28, 1922.

1,436,722

UNITED STATES PATENT OFFICE.

JOSEPH H. POPE, OF HAMILTON, MASSACHUSETTS, ASSIGNOR TO UNITED SHOE MACHINERY CORPORATION, OF PATERSON, NEW JERSEY, A CORPORATION OF NEW JERSEY.

MACHINE FOR CUTTING AND ASSEMBLING SECTIONAL-HEEL LIFTS.

Application filed October 21, 1918. Serial No. 259,044.

*To all whom it may concern:*

Be it known that I, JOSEPH H. POPE, a citizen of the United States, residing at Hamilton, in the county of Essex and State of Massachusetts, have invented certain Improvements in Machines for Cutting and Assembling Sectional-Heel Lifts, of which the following description, in connection with the accompanying drawings, is a specification, like reference characters on the drawings indicating like parts in the several figures.

This invention relates to the manufacture of heels and has for its object the substitution of mechanical power for a laborious hand operation incident to the manufacture of heels by one of the oldest and most popular systems of heel making, known as the Haverhill die system. In this and allied systems to which this invention is also applicable heels are made largely from scrap sole leather by forming one or more of the lifts from a plurality of pieces cut into an inverted die within which the heel is built by accumulating successive lifts cut one upon another. The workman with one hand holds a piece of stock upon the top cutting edge of the die and with the other hand strikes the piece of stock with a heavy maul to cut it and drive it into the die. The pieced lifts commonly consisting of three pieces are made by straight edging a scrap of leather by holding it over a stationary blade and striking the scrap with the maul. Then the scrap is similarly held over one side of the die and struck to cause that side of the die to cut it and to force it, as a portion of the lift, into the die. Then a second scrap is straight edged, usually on both lateral edges, one straightened edge is applied to the die parallel with the straightened edge of the first piece, and the second piece is struck into the die. Then a third piece is similarly treated and completes the heel lift. The operation is then repeated for the next lift, the breaks between the pieces of successive lifts running in different directions, until the accumulation of lifts represents the height for the desired heel after which suitably arranged nails are inserted to secure the pieces of lifts together. Usually the first or the last lift, or both are whole lifts to bind the pieced lifts together. By this system heels can be made at a very low "material" cost but at a high labor cost because it requires many blows of the heavy hand maul to produce each heel.

The present invention modifies the system so as to eliminate entirely the fatiguing labor, thus largely increasing the production and permitting a much wider range of physique in the employees selected for this work. One advantage of this invention is to open this field of heel building to women and girls, who have heretofore been entirely excluded from it by the demands for physical strength. By the aid of this invention a girl with characteristic deftness can show greater production than the average man and maintain that production undiminished throughout the day.

An important feature of the invention resides in the provision of a manually controllable power maul pivoted to be swung by hand into and out of operative relation with respect to an upwardly facing die about a pivot above the die, a manually operable member for initiating a cutting operation being mounted to move with the maul so as to be at all times readily accessible to the operator.

Another feature of the invention comprises an upwardly facing die and an adjacent straight edging blade both arranged to cooperate with a power maul in such manner that a piece of stock may be forced upon either the die or the blade.

A further feature of the invention consists in novel means for causing automatic adjustment of the maul so as to present constantly fresh cutting surfaces on the maul to the cutting dies or blades.

These and other features of the invention will be better understood from the following description of the illustrated embodiment of the invention, reference being had to the accompanying drawings, and will be particularly pointed out in the appended claims.

Figs. 1 and 2 of the drawings are front and side elevations, respectively, of an illustrative embodiment of my invention;

Fig. 4 is a detail in section along the line 4—4 of Fig. 1; and

Fig. 5 is a detail sectional view showing die and nail driving mechanism in section.

Figure 2:
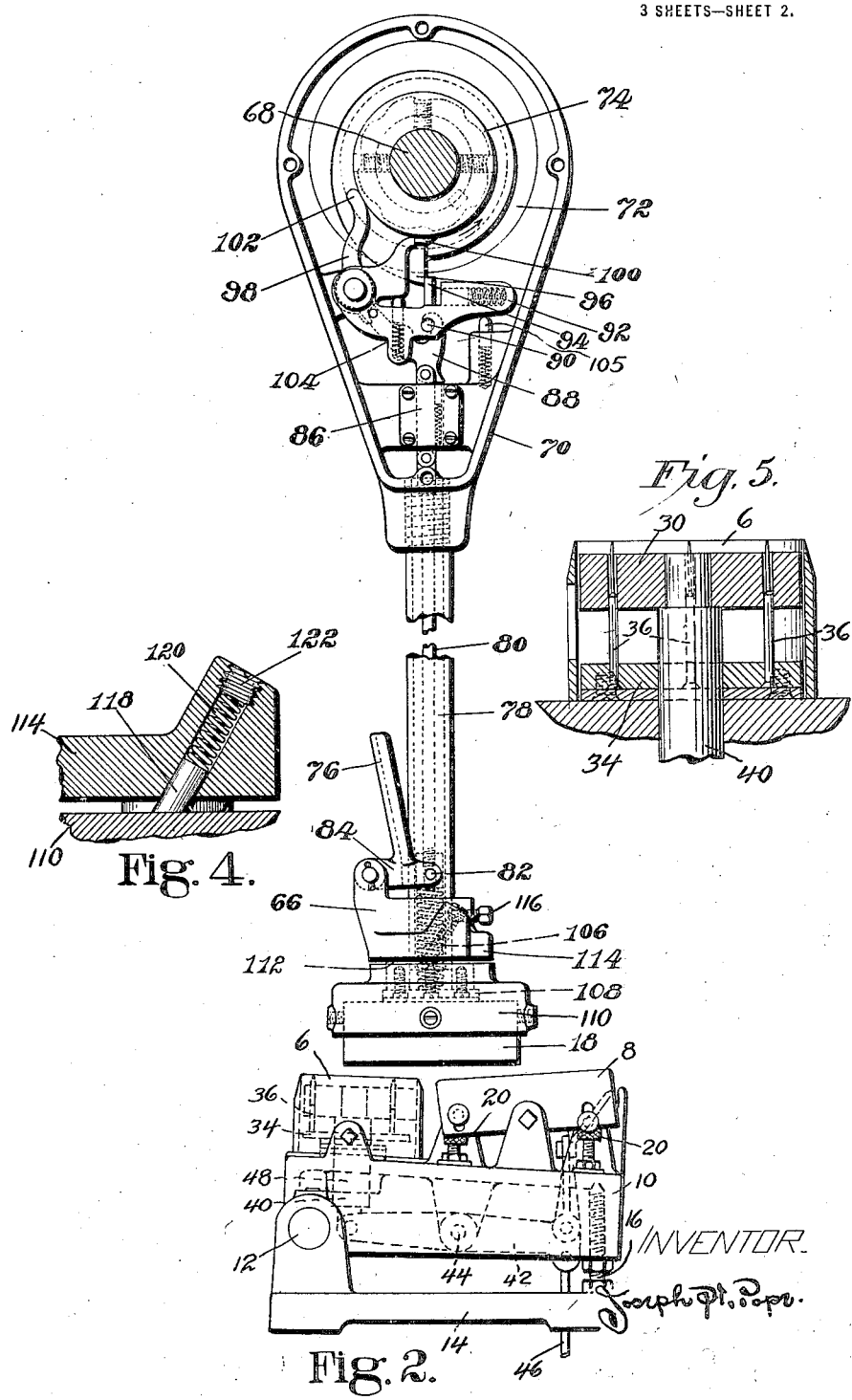

In the present embodiment of the invention, the die 6 and the blade 8 are shown secured to the upper surface of a table 10 which is pivotally mounted at 12 on a support 14 which may be either a specially constructed frame for the machine or a work bench or table serving as a support for a series of dies and blades constituting component parts of a plurality of machines constructed according to my invention. The table 10 can be adjusted as to its inclination with respect to the support 14 by means of a screw threaded member 16, the purpose being to adjust the die 6 which is supported on the table in such a way that the plane of the upper edge of the die will be parallel to the plane of the lower face of the cutting block 18 on the maul when the latter has been oscillated into position over the die. As will be hereinafter described, the maul or presser member 18 is mounted on a line shaft so located that the maul is suspended midway between the die 6 and the blade 8. Adjustment of the blade 8 is effected by supporting the same at each end upon adjustable members 20, it being obvious that by proper manipulation of the members 20, the upper edge of the blade may be readily adjusted to lie evenly in contact with the lower face of the block when the same has been lowered to perform a cutting operation on the work material. Thus both the die and the blade can be adjusted to variations in the arc through which the maul swings. When two or more cutting members are arranged in line, I have found that equally desirable results can be obtained by positioning the said cutting members on a surface curved to correspond to the arc in which the lower end of the maul swings. The blade 8 is further held in proper position by means of bolts 22 which pass through slightly elongated slots in the ends of the blade. Contacting with the opposite sides of each end of the blade are buttons 24 arranged to press firmly against the blade and yet permit slight adjustment of the ends when the middle of the blade is acted upon by the set screw 26 to cause slight lateral bending of the blade intermediate of its ends. In the manufacture of sectional heel lifts, it is desirable that the abutting edges of the sections in each lift should make good contact especially at each end of the line of abutment at which points an improper fitting together of the sections would be apparent in a finished heel. Hence, the blade is bent or curved slightly, thus producing a slightly concaved cut on each section and ensuring that the ends of the sections may be brought into firm contact with each other. The die 6 is mounted fixedly yet detachably on the table 10 by means of screw threaded adjustable members 28 mounted in projections on the table and arranged to engage in spots on opposite sides of the die. As shown the die is mounted with its cutting edge facing upwardly, the arrangement being such that, as heel lifts or sections thereof are cut by the co-operation of the cutting block and die, the same are forced downwardly into the die against the plate 30 which is normally yieldingly maintained with its upper face in the plane defined by the upper cutting edge of the die. As each lift or section of lift is cut into the die, the plate is depressed a distance corresponding to the thickness of the lift or lift section. In many cases, the lifts or sections of lifts are secured together by paste or cement but in the present instance it is considered desirable to provide additional securing means in the form of nails or other fastenings and the plate 30 is accordingly constructed to hold these fastenings in position while the lifts are forced upon the ends of the fastenings and thus secured together as they are forced into the die. Accordingly, the plate 30 is provided with a plurality of openings or passageways 32 which correspond to the shape of the fastenings to be used and which maintain the fastenings with their points uppermost. Mounted in a block 34 within the die are fastening drivers 36 corresponding in number with the openings 32 and designed to support the fastenings placed in said openings and to enter the openings as the plate 30 descends during the operation of accumulating a plurality of lifts or sections thereof within the die. It will be apparent that, as the lifts are forced into the die, they are secured together by the fastenings in the manner described and that a heel of predetermined thickness is built upon forcing the proper number of lifts into the die. In Fig. 2 of the drawings the plate 30 is shown depressed three eighths of an inch as this is the thickness of a heel section for which the die has been adjusted. Should it be desired to construct a thicker heel or heel section, one or more of the washers 38 may be removed and the block 34 and plate 30 replaced, the latter being designed to accommodate and drive fastenings of various lengths (within a fixed maximum which corresponds to the thickness of the plate), the removal of the washer or washers providing for the accommodation of a larger number of lifts and, therefore, a thicker heel section in the upper portion of the die. In making these adjustments, it is necessary merely to loosen the screw threaded members 28 when the die may be readily removed and the plate 30 and the block 34 may, with equal facility, be removed and replaced to co-operate in the driving of fastenings of another size or length. Extending through the support 10 and axially of the die is a plunger 40 attached pivotally to the end of a lever 42 mounted at 44 in the table 10 and connected at its other end by a rod 46 to a manually operable member which, in the present construction, is preferably a treadle (not shown). Preferably a spring is connected to the rod 46 and to some fixed point on the supporting framework or bench and operates to maintain a shoulder on the plunger 40 in contact with the lower surface of the boss 48 on the under surface of the table 10, the arrangement being such that the plunger 40 is of such a length as to support the upper surface of the plate 30 level with the upper or cutting edge of the die. As heretofore pointed out, the plate 30 is depressed progressively as lifts are driven into the die. Obviously a completed heel or heel section may be ejected by causing a movement of the plunger in an upward direction and this is accomplished by stepping on the treadle.

Figure 1:
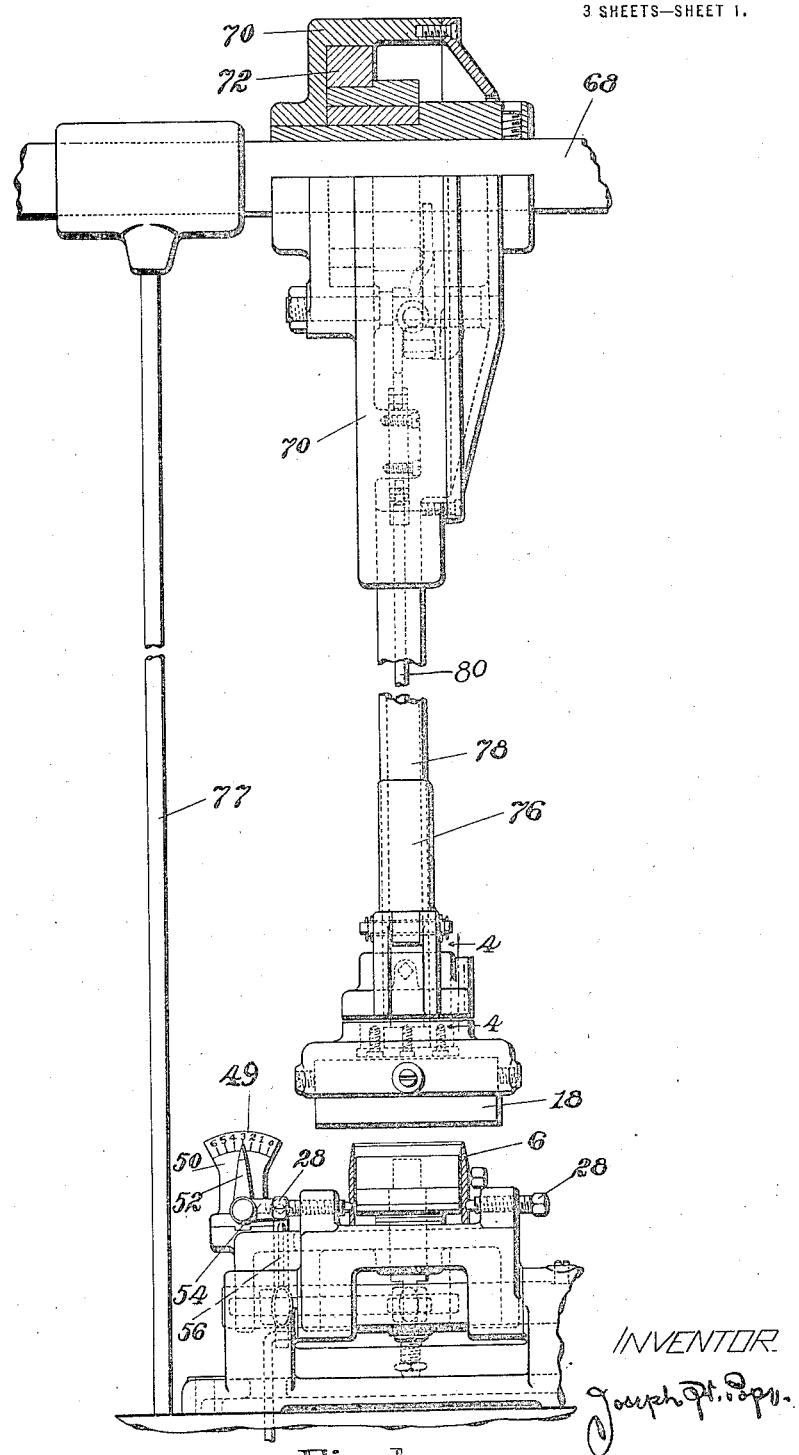
Figure 3:
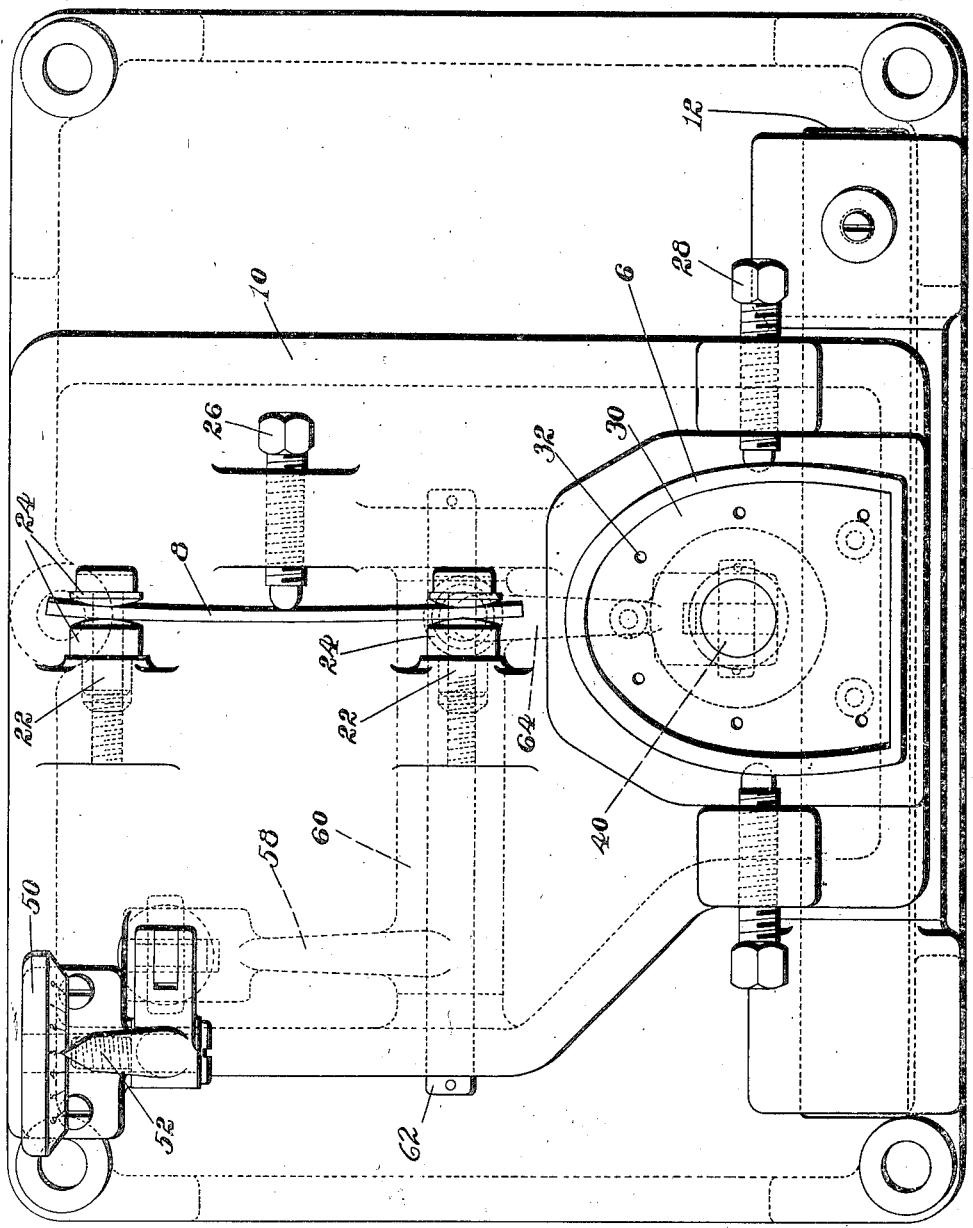
Fig. 3 is a plan view of the heel die and the straight edging blade.

In order to indicate to the operative the thickness of the heel section at any time present in the die, there is provided an indicator 49 consisting of a member 50 provided with a scale with numerals in proper relation thereto and a pointer 52 which is moved over the scale in accordance with the thickness of the lifts or lift sections, as they are progressively forced into the die. This pointer is fixedly attached to one arm of a bell crank 54 (Fig. 1) the other arm of which is pivotally connected by a link 56 with the arm 58 of another bell crank 60 (Fig. 3) mounted on a pivot pin 62 on the lower surface of the table 10, the said bell crank having another arm 64 having a bifurcated end slidably connected with the mechanism which operates the plunger 40. Thus, as the plunger is progressively forced downwardly during the insertion of successive lifts in the die, the pointer is correspondingly moved over the scale to indicate the thickness of the section at any stage of its formation.

A power operated maul, indicated in its entirety by the reference character 66, is mounted to swing on and be operated from the line shaft 68. Accordingly, there is provided a driver or yoke member 70 at the upper end of the maul arranged to surround an eccentric 72 on the shaft and a clutch mechanism 74 of the well-known Horton type. Upon inspection of the drawings and especially of Fig. 2, it will be noticed that the maul is arranged to be oscillated about the shaft 68 so as to be brought selectively in alinement with either the blade 8 or the die 6. In thus manipulating the maul, the operative makes use of the shank 78 of the maul and when the maul has been brought into proper alinement with the die or the blade, an operative stroke of the block at the lower end of the maul is caused by movement of the handle 76 toward the shank 78 of the maul. The handle 76 thus operates as a trigger to cause the actuation of the power means for operating the maul. Attention is directed to the fact that only one blow will be struck on tripping the clutch and that before the maul can be operated a second time the handle or trigger 76 must be allowed to return to its normal position of rest. As many tie-rods 77 are provided as may be necessary to prevent undue yielding of the shaft 68 under the stress developed during the impact of the maul.

Briefly, the mechanism for tripping the clutch and causing actuation of the maul may be described as follows: A rod 80 is slidably mounted inside of the shank or pitman 78 of the maul and has its lower end connected to a pin 82 extending through elongated slots in the shank 78 and engaged with the forked ends of a lever 84 with which is fixedly connected the handle or trigger 76. The upper end of the rod 80 is pivotally connected by means of a link 86 to a latch member 88, the hooked end of which engages over a pin 90 on the clutch controlling member 92. Movement of the rod 80 downwardly upon actuation of the trigger 76 results in the removal of a stop 94 from the path of the projection 96 of the cage member of the Horton clutch, thus permitting the cage to move with the result that the clutch is thrown into operation and through one revolution of the shaft, the yoke is operated to cause a single blow to be delivered by the maul and is then returned to its upper or normal position of rest. In order to release the latch 88 from the pin 90 on the clutch controlling member 92, there is provided a latch controlling member in the form of a double armed lever 98 which is actuated by a projection 100 which, turning in the direction of the arrow in Fig. 2, contacts with the end 102 of the lever causing lateral movement of the same and a corresponding movement in the opposite direction of the end 104 of the lever to effect movement of the latch member 88 to such an extent as to release the pin 90. Upon release of the clutch controlling member 92, it is returned upwardly by a spring pressed plunger 105 to position the stop 94 again in the path of the projection 96 on the cage member of the clutch, thus disengaging the clutch at the end of one revolution. This one revolution clutch mechanism is old and well known and forms no part of my invention. The spring 106 rests at its lower end on a plate 108 and is arranged to press against the lower end of the rod 80, and thus operates upon release of the trigger 76 to return the rod to its normal upper position of rest in which the latch member 88 is again engaged with the pin 90.

The cutting block, at the lower end of the maul, may ordinarily be constructed of a block of wood, though it may be made of any equivalent material or of any material ordinarily used for the purpose. This block is securely mounted detachably in a holder 110 slidably and rotatably secured on a bearing 112 by means of the shouldered plate 108 fixedly secured to the lower end of said bearing. The bearing constitutes a part of a member 114 which is preferably screw threaded on the lower end on the shank 78 so as to provide for adjustment of the block with respect to the die, the member 114 being held securely in its adjusted position by means of a set screw 116. Mounted in the member 114 in an inclined passageway therein, is a plug 118 of rubber, fiber, or other suitable substance, arranged to contact with the upper surface of the block holder 110. Secured in the same inclined passageway is a spring 120 operating to hold the plug 118 yieldingly in contact with the holder, a screw threaded closure member 122 being provided for the passageway so that either the spring or the plug 118 may be removed and other parts substituted therefor when, for any reason, such substitution becomes either necessary or desirable.

In the operation of the maul, the cutting block and its holder, upon contact with the work material, is moved directly upwardly on its bearing 112; thus causing the plug 118 to retreat into its passageway. At the end of the cutting operation and as soon as the maul is lifted, the block and block holder move downwardly on the bearing 112 and at the same time the plug 118 under the action of the spring 120 causes a slight rotation of the block holder, this operation being repeated for every action of the maul. It is clear, therefore, that a fresh cutting surface is provided in co-operation with the die and the blade at each operation of the maul since, during these operations, the block is intermittently turned in one direction due to the operation of the slidable plug cooperating with the upper surface of the holder, as above described.

In the steps of building heels or heel sections from scrap material, the operative will make use of both the die 6 and the stationary blade 8, a piece of material being presented first to the blade and given a straight edge, or preferably a slightly concaved edge, through the operation of the cutting block at the lower end of the maul. As the next step in the operation, the piece of material is placed over the die with the freshly cut edge intersecting the edge of the die at two points. The maul is then swung into proper position over the die and the section is cut into the die. Another piece of material is straight edged in the manner described, and this edge is brought into closely abutting relation to the edge of the piece previously cut into the die and the maul again operated as before. These operations are repeated until an entire lift is completed. Another sectional lift is then built in the same way with the lines joining the sections angularly related to the lines in the previously made lift. The heel section may then be completed by cutting into the die a lift comprised of a single piece of material. Upon completion of the heel or heel section, it is ejected from the die in the manner described.

Having thus described my invention, what I claim as new and desire to secure by Letters Patent of the United States is:

1. In a machine of the class described, a die having an upwardly facing edge, a power maul manually controllable for swinging movement about a horizontal axis above the die and into and out of position over the die, and means movable with the maul for initiating a cutting operation by which the stock is struck into the die.

2. Heel making apparatus comprising a heel die having an upwardly facing edge, a power maul suspended to be manually swung over the die about a horizontal axis above the die, a driver for the maul, and a tripper for the driver located in the maul handle in position to be operated by the workman when he has swung the maul over the die.

3. Heel making apparatus comprising an upwardly facing die having a heel ejector operatively arranged within it, a straight edging blade adjacent to the die, and a power operated maul movable between operative positions over the die and the blade.

4. Heel making apparatus comprising an upwardly facing die having a heel ejector operatively arranged within it, a straight edging blade adjacent to the die, a power operated maul occupying a normal operative position over the blade and manually movable to a position over the die, and a tripper associated with a part of the maul and adapted to be grasped for causing the maul to straight edge a piece of stock and subsequently to cut the stock into the die.

5. In a machine of the class described, a work bench, an upwardly facing heel die on the bench, an overhead shaft, a driver on the shaft, a clutch between the shaft and the driver, a pitman suspended from the driver, a maul on the pitman near the die, a handle on the pitman, and a clutch controller associated with the handle.

6. The combination with a power maul pivoted to swing in a vertical plane with its lower end movable along the arc of a circle, of upwardly facing die and cutter arranged to co-operate with the maul when located selectively upon radii intersecting the arc at different points therein.

7. The combination with an upwardly facing heel die and a straight edging blade, of a power maul pivoted to swing in a vertical plane and adapted to be positioned over either the die or the blade alternatively, and manually controlled means to cause the maul to force a piece of stock upon the die or upon the blade.

8. In a machine of the class described, the combination with a straight edging blade and an upwardly facing die, of means within the die to hold heel building nails in position to have the heel lifts forced upon the nails as the lifts are cut into the die, and power means for forcing lifts into the die, said power means being under direct manual control for locating it selectively above said die and blade.

9. The combination with a straight edging blade and an upwardly facing die, of a plate in the die arranged to be forced downwardly by the heel stock cut into the die and adapted to hold a heel building nail in position to have the stock forced upon the nail as it is cut into the die, power means movable from and into position over the die for forcing the stock into the die and alternatively over the blade for straight edging the stock, and means carried by said movable power means for controlling the same at the will of the operative.

10. The combination with a straight edging blade and an upwardly facing die, of a plate in the die arranged to be forced downwardly by the heel stock cut into the die and adapted to hold a heel building nail in position to have the stock forced upon the nail as it is cut into the die, power means for forcing the lifts into the die and means for mounting the power means for free movement under direct control of the operative so as to be positioned at will for cooperation with the straight edging blade.

11. In a machine of the class described, the combination with an upwardly facing die, of a straight edging blade for preparing stock to be cut into pieced lifts in the die, said blade being formed to provide a slightly concaved edge whereby the abutting straight edged pieces of a lift cut by said blade will engage each other at their ends only.

12. In a machine of the class described, the combination with an upwardly facing die, of a straight edging blade for preparing stock to be cut into pieced lifts in the die, and means to shape the blade to a slightly curved form whereby the abutting edges of the lift sections cut by the blade meet in such manner as to provide for firm contact of the abutting edges at and adjacent to their ends.

13. The combination with a plurality of cutting tools having upwardly facing edges, of a power maul suspended to swing about a center over the tools, means to give the maul a predetermined stroke, and a support on which the tools are arranged with their edges tangent to an arc related to the center of swinging movement of the maul.

14. Heel lift producing apparatus comprising a bench, an overhead shaft, a driver on the shaft, a clutch, a plunger suspended from the driver for swinging movement over the bench, a maul on the plunger, a clutch controller associated with a part of the plunger that is adapted to be grasped for swinging the maul, and a plurality of upwardly facing cutting tools upon which the maul is adapted to force stock and which have their cutting edges arranged substantially tangent to an arc concentric with that in which the maul normally swings.

15. In a cutting machine, a cutting member, a maul mounted for movement at the will of the operative with relation to the cutting member and comprising a cutting block, and means contained completely within the maul for causing intermittent rotation of said block to present constantly fresh cutting surfaces to the cutting member.

16. In a cutting machine, cutters, a maul mounted for movement at the will of the operative with relation to the cutters and comprising, a cutting block, a support for said block, and means mounted in the support for causing intermittent rotation of the cutting block during the operations in which the cutting block co-operates with the cutters.

17. In a maul, a cutting block, a support for the block providing a bearing upon which the block is slidably and rotatably mounted, and means mounted in the support for causing intermittent rotation of the block.

18. In a power maul, a shaft, a maul suspended from said shaft, a cutting block at the lower end of said maul, means for supporting said block on the maul for both reciprocable and rotary movements thereon, and means for causing intermittent rotation of the cutting block.

19. In a power maul, a cutting block and a support on which the cutting block is rotatably and slidably mounted, and means in the support comprising a slidably mounted member for causing rotation of the cutting block.

20. In a cutting machine, a line shaft, a power maul suspended from said shaft for oscillatory movement at all times under the control of the operative, and cutting members supported stationary in alinement in a direction transverse of that of said shaft and arranged for co-operation with said maul.

21. In a cutting machine, a constantly driven shaft, a power maul suspended from said shaft and arranged to swing about the axis thereof, and to be operated thereby, and cutting members arranged to co-operate selectively with said maul as the lower end thereof moves downwardly from certain definite positions in the arc traced by said end of the maul.

22. In a cutting machine, a shaft, a power maul swingingly suspended from said shaft, means under the control of the operative for causing the actuation of the maul from said shaft, cutting members arranged at cutting stations to co-operate with said maul in operating on the work material, and means for adjusting the cutting members so that each cutting member will co-operate perfectly with the maul as it is moved by the shaft at the various cutting stations along the arc described by its oscillation.

23. In a cutting machine, a power shaft, a power maul suspended from said shaft, an operable connection between the shaft and maul, and hand operated means for moving the maul and for causing an operative connection of the maul and shaft for operation of the maul.

24. In a cutting machine, a rotary shaft, a power maul suspended from said shaft, a plurality of cutting members with which said maul co-operates for cutting the work material, upon rotation of the shaft, and means for locating the maul selectively with respect to said cutting members and for causing the actuation of the maul.

25. In a machine of the class described, a constantly running power shaft, a maul suspended from the shaft to swing about the same as a center, and means between the maul and the shaft and operated by the latter for causing operative movements of the maul.

26. In a machine of the class described, a maul, a constantly running power shaft, and an eccentric loosely mounted on the shaft and surrounded by the maul so that the latter is operated by the eccentric when the latter is connected to the shaft.

27. In a machine of the class described, a maul, a constantly running power shaft surrounded by the maul, means interposed between the maul and the shaft for operating the maul when said means is connected with the shaft, a clutch for connecting said means with the shaft, and means associated with the maul handle for controlling said clutch.

28. A machine for making and assembling heel lifts comprising a support, a blade mounted on the support and operable for straight edging pieces of material, a die mounted on the support adjacent to the blade and having an upwardly facing cutting edge, and a power-operated maul movable between operative positions over the die and the blade and arranged to co-operate with the blade in straight edging the material and with the die in cutting lifts or lift sections from the material and forcing them into the die in assembled relation with previously cut lifts or lift sections.

29. In a machine of the class described, a die having an upwardly facing edge, a power maul suspended to be manually swung over the die about a horizontal axis above the die, power means for operating the maul, and a tripper for causing actuation of the power means located on the maul shank in a position accessible to the operator.

30. In a machine of the class described, a die having an upwardly facing cutting edge, a power maul suspended to be manually swung over the die upon a horizontal axis above the die, power means for driving the maul, and a tripper movable on the maul shank for causing actuation of the power means.

31. In a machine of the class described, a support, a plurality of tools having upwardly facing cutting edges mounted on the support so that their edges are tangent to an arc struck from a center above the support, and a maul arranged to be suspended from the center of said arc and operable for forcing material upon the cutting edges of the tools.

32. In a machine of the class described, a support, a cutter mounted on the support with the plane of its cutting edge at an inclination to the horizontal, and a presser member mounted so as to be brought into proper co-operative relation with the cutter wherever the latter may be located on the support.

33. In a machine of the class described, a support, a cutter mounted on the support, and a presser member mounted on a pivot above the support to swing in a vertical plane and along an arc of a circle, and so arranged that its pressure-applying surface is parallel with the plane of the cutting edge of the cutter when the presser member is in co-operative relation to the cutter wherever the latter may be located along said arc.

34. The combination with a presser member pivoted to swing in a vertical plane with its lower end movable along the arc of a circle, of upwardly facing cutters arranged to co-operate with the presser member when the latter is located selectively upon different radii intersecting the arc at points above the cutters.

In testimony whereof I have signed my name to this specification.

JOSEPH H. POPE.